May 17, 1960     M. E. BONOMO ET AL     2,936,838
VERTICAL MULCHER
Filed Jan. 2, 1959     4 Sheets-Sheet 1
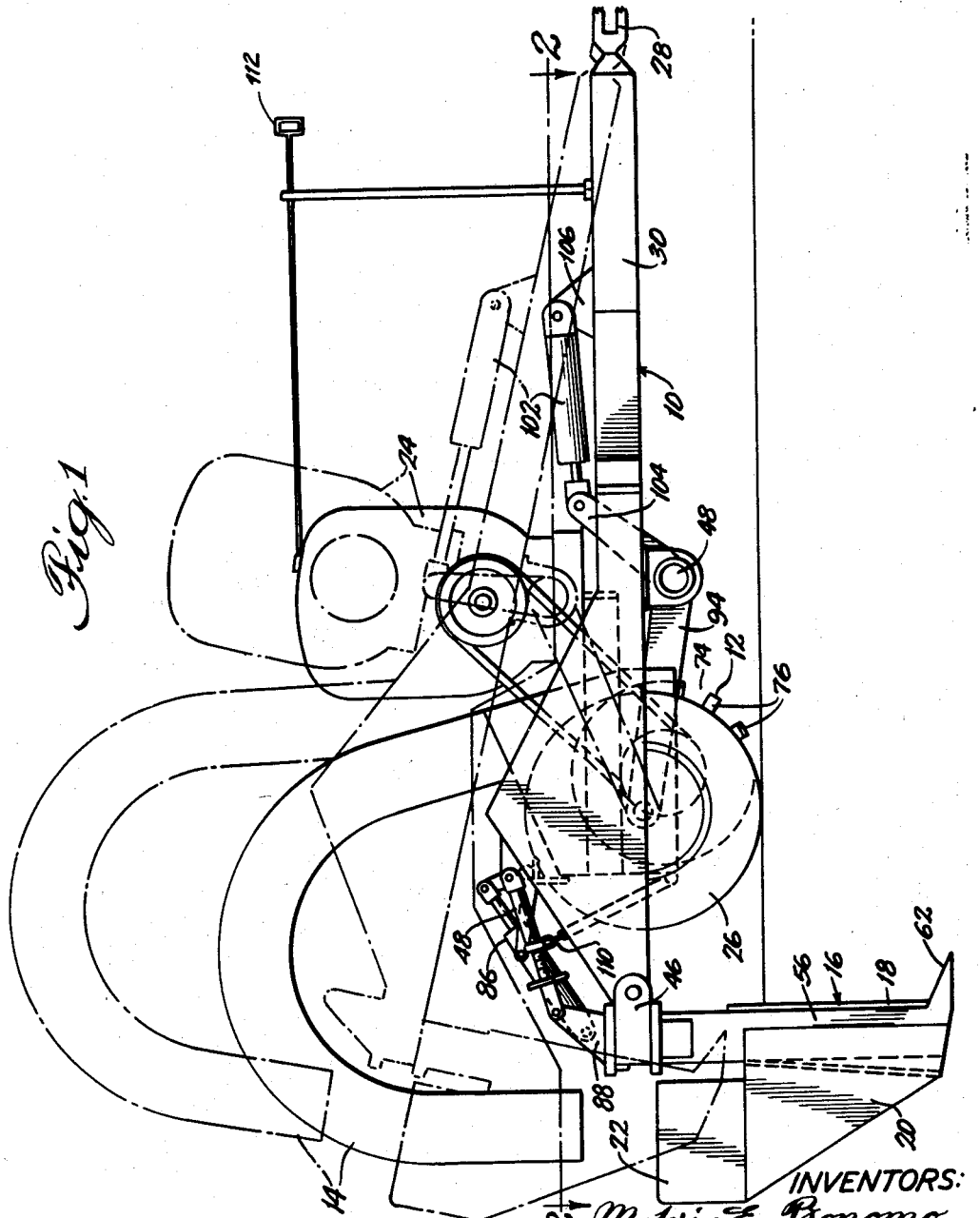
INVENTORS:
Melvin E. Bonomo,
John O. Bradford and
Elmer R. Meiners,
BY Baer, Freeman and Molinare
ATTORNEYS.

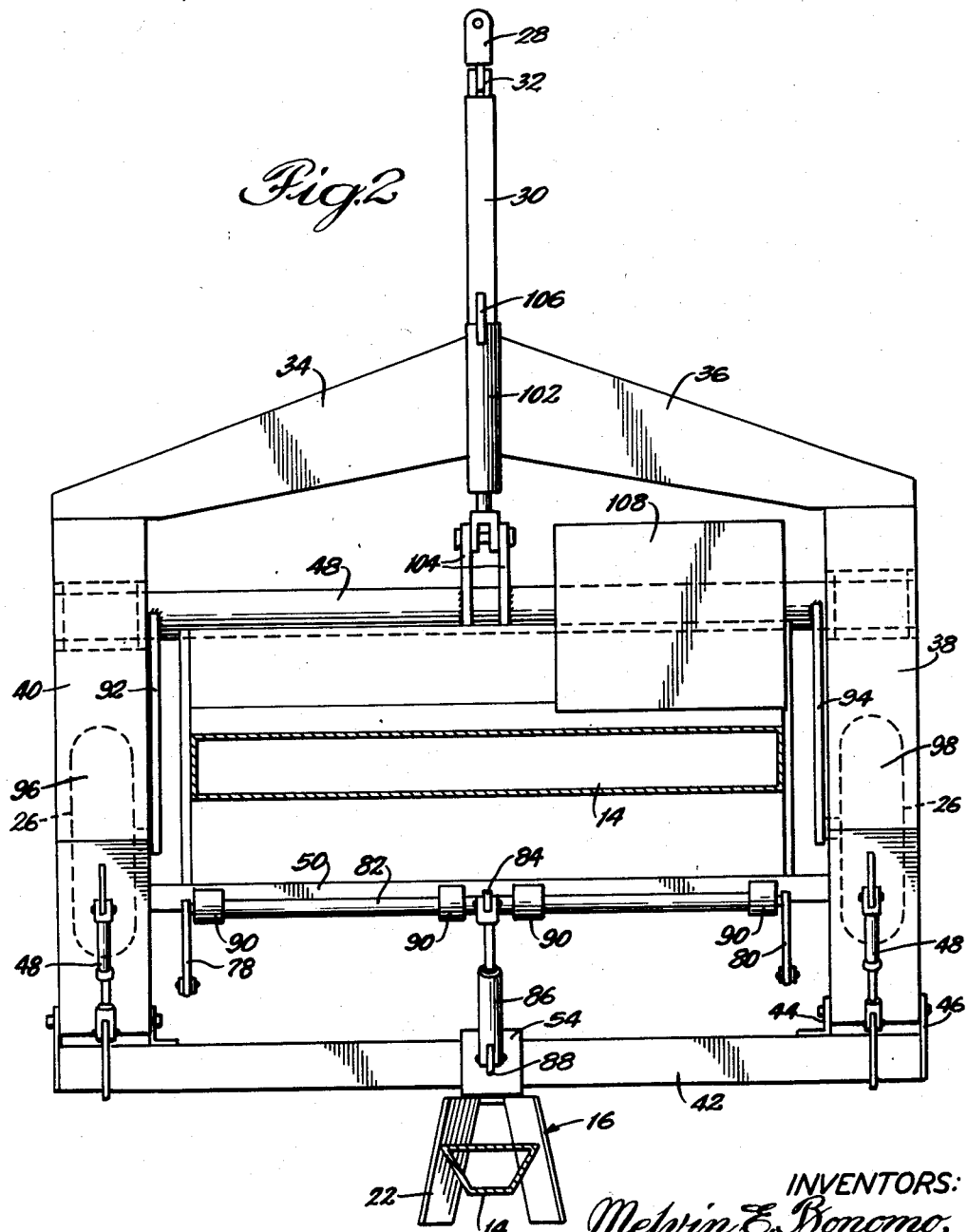

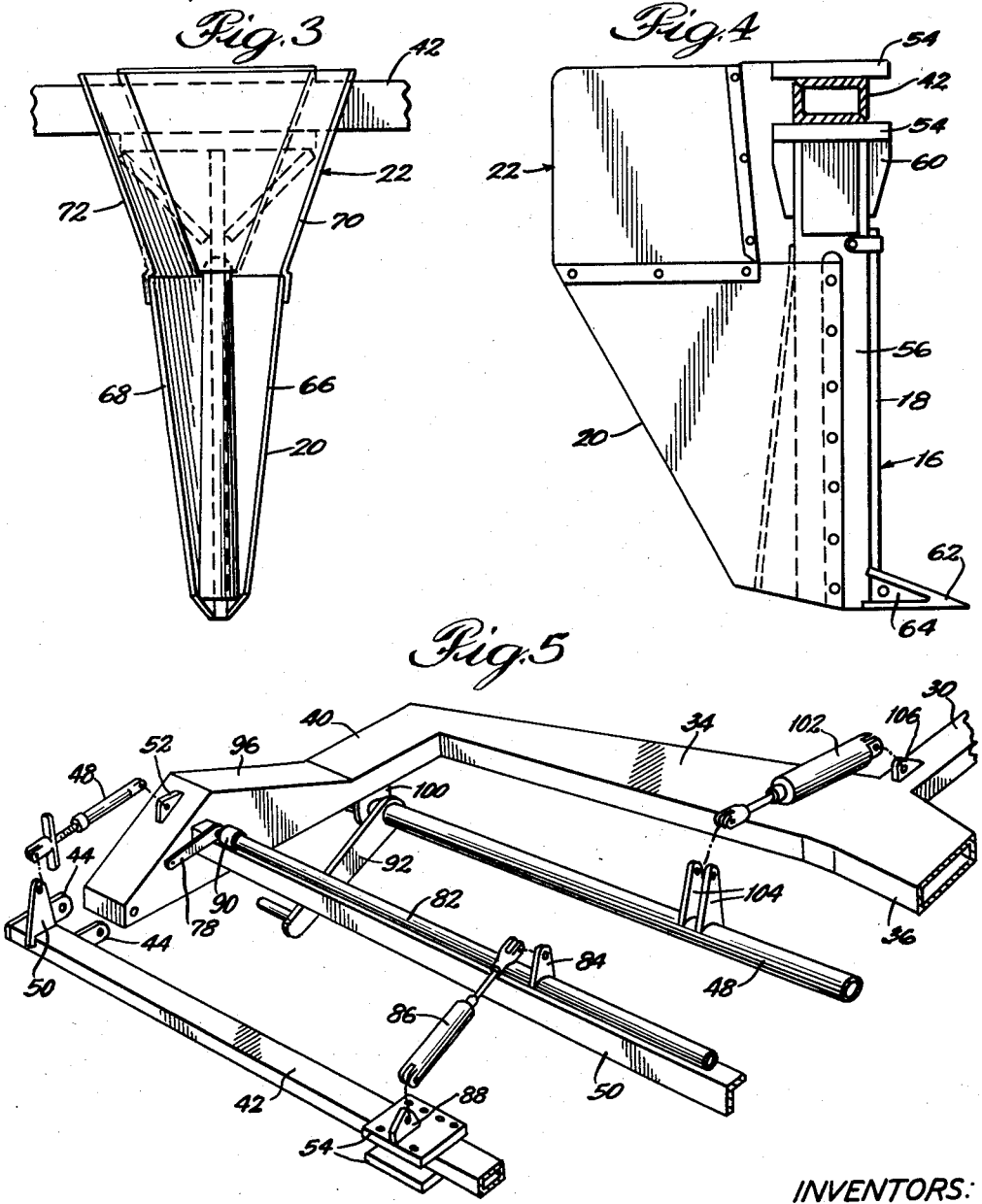

May 17, 1960  M. E. BONOMO ET AL  2,936,838
VERTICAL MULCHER

Filed Jan. 2, 1959  4 Sheets-Sheet 4

INVENTORS:
Melvin E. Bonomo,
John O. Bradford and
Elmo R. Meiners,

BY Bair, Freeman & Molinare
ATTORNEYS.

United States Patent Office 2,936,838
Patented May 17, 1960

2,936,838

VERTICAL MULCHER

Melvin E. Bonomo and John O. Bradford, Gibson City, and Elmo R. Meiners, Anchor, Ill.

Application January 2, 1959, Serial No. 784,593

6 Claims. (Cl. 172—28)

This invention relates generally to new and improved agricultural apparatus, and more particularly to unitary agricultural apparatus for soil and water conservation.

Vertical mulching is a recently developed soil and water management technique which has evolved from the inconsistent performance of subsoiling and the continued need for improved methods of agricultural conservation. In subsoiling practice, the subsoiler chisel is inserted a desired depth into the soil and is driven to form a channel or trench for the purposes of aerating the soil, and controlling erosion and water runoff. However, prior art devices for effecting subsoiling have not proved entirely satisfactory for the reason that the trench or channel formed by the subsoiler could not be kept open for extended periods of times, Whenever it would rain, for example, the subsoiling channel would silt in, and usually by the end of one year or less, the channel would be completely sealed over and totally ineffective.

The combination of mulching with subsoiling provides a technique which has proved very effective in solving the problems discussed above. Thus, the chopping of crop trash and the filling of the subsoiling channel with the chopped trash serves not only to keep the channel open, but further enables greater control of water runoff, subsoil aeration and water storage.

Accordingly, it is a general object of this invention to provide new and improved agricultural apparatus for soil and water conservation.

It is a more specific object of this invention to provide a unitized structure for effecting combination subsoiling and mulching operations.

It is a further object of this invention to provide novel vertical mulching apparatus adapted to be pulled by a prime mover, such as a tractor, but being otherwise completely self contained for effecting combined subsoiling and mulching operations.

It is a still further object of this invention to provide novel vertical mulching apparatus, as described above, which comprises, in combination, a trash chopper, a trash-directing hood, and a subsoiler formed as an integral cooperative structure.

It is another object of this invention to provide a novel soil conservation device which carries out the steps of forming a trench or channel in the soil, chopping trash picked up from the ground, and confining the chopped trash to a limited area to be placed into the trench or channel, whereby the trench is held open for substantial periods of time.

It is still another object of this invention to provide a unique soil conservation device, as describe above, which is characterized by its flexibility, its relative compactness and its efficiency of operation.

Further objects and advantages of this invention will become apparent as the following description proceeds, and the features of novelty which characterize this invention will be pointed out with particularity in the claims annexed to and forming a part of this specification.

A preferred embodiment of the invention is shown in the accompanying drawing, in which:

Figure 1 is a side elevational view of an illustrative vertical mulching apparatus in accordance with the invention, showing the invention in operating position in full lines and in transporting position in broken lines;

Figure 2 is a plan view in cross section of the invention taken along lines 2—2 of Figure 1;

Figure 3 is a rear elevational view of one form of subsoiling chisel adapted for use in the invention;

Figure 4 is a side elevational view of the subsoiling chisel of Figure 3;

Figure 5 is a perspective view of a portion of the frame of the invention, with parts removed to simplify the illustration of its construction;

Figure 6:
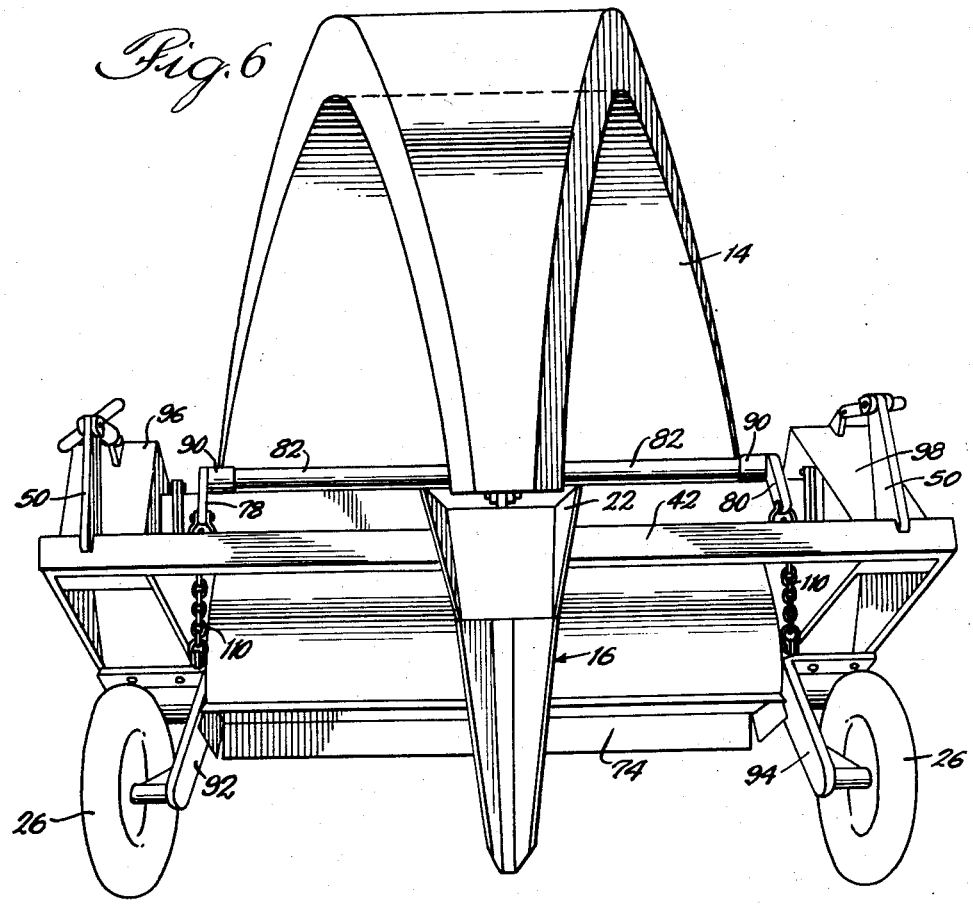
Figure 6 is a rear elevational view of the illustrative vertical mulching apparatus shown in Figure 1 of the drawing.

Referring now to the drawing, and more particularly to Figure 1 thereof, there is shown an illustrative embodiment of the invention wherein the vertical mulcher is shown in operating position in solid lines and in transporting position in broken lines. Advantageously, the vertical mulching apparatus is provided in a form of an integral or unitary assembly which comprises, in the combination, a frame 10; a chopper unit 12 adapted to produce a mulch and pivotally mounted to said frame; an elongated arcuate hood or spout 14 for receiving the mulch chopped by the chopper unit and directing the mulch into a predetermined discharge path; and a subsoiling chisel assembly 16 pivotally attached to the rear end of the frame 10 and including a blade portion 18 for cutting a trench in the soil, an outwardly flaring wing portion 20 for holding the trench open to thereby facilitate the placement of mulch into the trench, and a hopper 22 positioned intermediate the wing portion 20 and the discharge end of the hood 14 for directing the mulch discharge from the hood into the subsoiling chisel assembly. As explained in greater detail below, the subsoiling chisel assembly 16 is provided with selectively actuatable means for permitting adjustment of the chisel assembly height, and further selectively actuatable means for adjusting the cutting angle of the assembly relative to the soil.

In accordance with an aspect of this invention, the vertical mulcher has positioned thereon a power unit 24 to supply power to the chopper 12 and to the selectively actuatable height adjustment means described above. In accordance with a further feature of the invention, the entire vertical mulcher is made easily transportable by means of a pair of wheels 26 adapted to support the frame assembly 10. The front portion of the frame assembly 10 is provided with a hitch 28 adapted to be connected to any suitable prime mover, such as an agricultural tractor. It is one of the outstanding features of the vertical mulcher comprising the present invention that there is combined in a single compact apparatus all of the elements necessary to perform relatively heavy functions of vertical mulching on a commercial scale in the field. All that is required in addition to the invention is an operator and a prime mover, such as a tractor, to pull the apparatus.

Figure 2 is a plan view in cross section of the invention showing the frame assembly in greater detail. The frame assembly includes in its front portion a draw bar or tongue 30 which is connected at its front end to the hitch 28 through a suitable connecting plate 32. At the rear portion of the tongue 30, and flaring rearwardly therefrom, is a pair of front frame wings 34 and 36, respectively. Each front frame wing is secured to a side frame wheel housing, wheel housing 38 being secured to front frame wing 36 and wheel housing 40 being secured to front frame wing 34. The rear portions of the side frame wheel housings are connected to opposite ends of a transverse tool bar 42, as by means of an inside support bracket 44 and an outside support bracket 46 provided at each junction of a side frame wheel housing and the tool bar.

Additional rigidity is provided for the frame assembly by means of a front frame cross bar 48 and a rear frame cross bar 50 positioned between the two side frame wheel housings. Advantageously, the vertical mulcher is adapted for heavy duty operations since the tool bar, the frame members, and the draw bar preferably are electrically welded boxed sections to provide maximum strength. The side frame wheel housings, which serve as fenders for the mulcher wheels, are in fact, specifically shaped sections of heavy steel plate, and thus it will be readily appreciated by those skilled in the art that while the vertical mulcher is a relatively compact assembly, its construction is similar to that of heavy duty types of heavy road machinery, thereby providing efficient and endurable use in the field.

As shown in greater detail in Figure 5 of the drawing, tool bar 42 is pivotally secured to the side frame wheel housings by means of the pivoted support brackets 44 and 46 at each end of the tool bar. Advantageously, the angle of the tool bar, and hence the operating angle of the subsoiling chisel assembly supported thereon, can be adjusted by means of a tool bar adjust turnbuckle 48 pivotally mounted between the tool bar adjust bracket 50 at each end of the tool bar 42 and the tool bar adjust bracket 52 on each side frame wheel housing. The subsoiling chisel assembly 16 is secured to tool bar 42 by means of a subsoiler connecting plate 54. Connecting plate 54 is provided with a plurality of openings such that the subsoiling chisel assembly 16 may be bolted thereon to facilitate the attachment and detachment of subsoiling chisel 16 from the frame.

The subsoiling chisel assembly 16 is shown in greater detail in Figures 3 and 4 of the drawing. It can there be seen that the subsoiling chisel assembly comprises a standard or shank 56 having a replaceable cutting edge 18 positioned at the front portion thereof. The upper portion of the shank 56 is secured to the tool bar connecting plates 54 by means of the standard top plates 60, as described heretofore, and the front lower portion of shank 56 is attached to a replaceable cutting tip 62 by means of the connecting plate 64. A pair of outwardly flaring wing members 66 and 68 of wing assembly 20 are secured to the rear portion of the standard 56, and a hopper 22 comprising a plurality of side panels 70 and 72 are attached to the top edges of the wing members 66 and 68, respectively.

The chopper unit 12, which advantageously may be a direct throw chopper mechanism of the flail type comprising a cylinder housing 74 and a plurality of heat-treated steel knives 76, is pivotally supported between the side frame wheel housings 38 and 40. Advantageously, the chopper knives are adapted to handle the heaviest standards of "in field" mulch material as well as large amounts of cobs, wood chips and other hauled-in mulch. The chopper cylinder housing 74 is dynamically balanced to minimize vibration and is supported by the side members 78 and 80 of the shaft 82 which, in turn, is rotatably journaled to the rear frame cross bar 50. Shaft 82 is pivotally connected, by means of bracket 84 at its center portion, to one end of a chopper height adjusting hydraulic cylinder 86. The other end of hydraulic cylinder 86 is pivotally attached to bracket 88 on the tool bar connecting plate 54. In accordance with a feature of this invention, a hydraulic cylinder 86 operates to rotate shaft 82 in its bearings 90 to raise or lower the chopper unit 12 as desired.

The side members 92 and 94 of the front frame cross-bar 48 are respectively connected to the axle of wheel 96 in side frame wheel housing 40 and to the axle of the wheel 98 in side frame wheel housing 38. The front frame cross bar 38 is pivotally supported in the side frame wheel housing brackets 100 such that rotation of the front frame cross bar 38 causes the frame assembly to be raised and lowered, as desired, with respect to the wheels 96 and 98. Advantageously, the raising and lowering of the frame assembly to provide height adjustment for the vertical mulcher is effected by means of the hydraulic cylinder 102 pivotally attached at one end thereof to the front frame cross-bar brackets 104 and at the other end thereof to the draw bar or tongue bracket 106.

Figure 7:
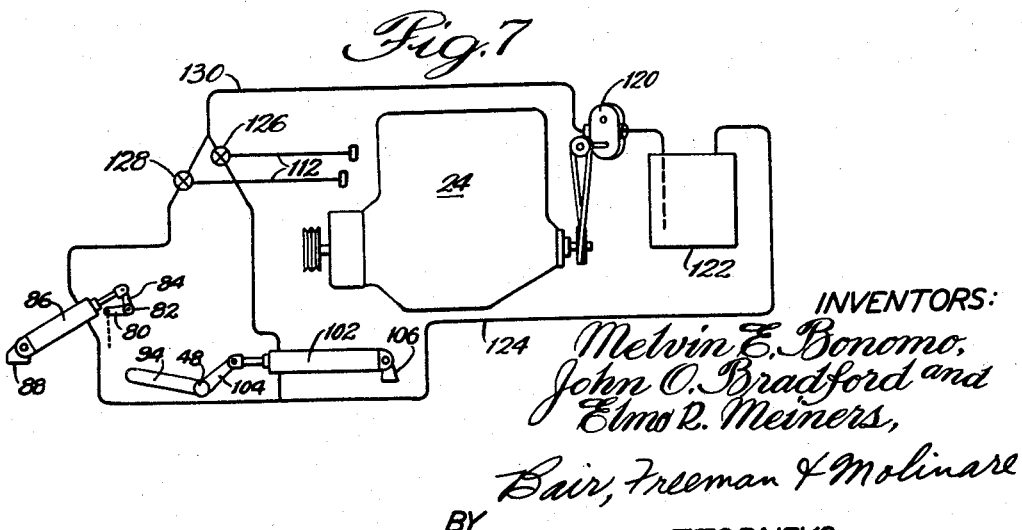
Figure 7 is a schematic diagram of one type of hydraulic control circuit which may be used in remotely controlling the chopper height and the frame assembly height in accordance with the invention.

An engine mount platform 108 is supportably positioned on the frame assembly support member 110, and is adapted to receive the engine 24 which supplies the operating power for the chopper unit 12 and the hydraulic cylinders 86 and 102. Those skilled in the art will readily appreciate that the hydraulic cylinders 86 and 102 may receive their operating power from the engine 24 by means of any suitable hydraulic control circuit. While the details of such a control circuit do not form a part of this invention, nevertheless, for purposes of illustration, one type of hydraulic control circuit that may be used, is shown in Figure 7 of the drawing. Thus, the engine 24 drives a suitable pump, such as the gear pump 120 to cause hydraulic fluid to be circulated from the reservoir 122 through a hydraulic circuit comprising the fluid conduit 124, a first hydraulic path including the hydraulic cylinder 102 and valve 126, a second hydraulic path including the cylinder 86 and valve 128, and the fluid conduit 130. Accordingly, it can be seen that the operation of the cylinders 86 and 102 may selectively be controlled by the remotely located push and pull rods 112 positioned conveniently adjacent the tractor seat.

In accordance with a highly advantageous feature of the invention, a hood or spout 14 is provided having a relatively wide feed opening adjacent the output of the chopper unit 12 and a relatively narrow discharge opening adjacent the hopper 22 of the subsoiling chisel assembly 16, as shown in Figure 1 of the drawing. The hood 14 is tapered along its elongated arcuate dimension to define a predetermined discharge path for the mulch produced by the chopper unit 12. The manner in which hood 14 is tapered along its elongated arcuate dimension is clearly shown in Figure 6 of the drawing.

As shown in cross-sectional view of Figure 2, the hood 14 advantageously is of rectangular cross section, although it will be readily appreciated by those skilled in the art that the hood is not limited to this particular shape and may take any other suitable cross sectional shape. In accordance with a feature of the invention, the side walls of the hood 14 are tapered from the relatively wide feed opening to the relatively narrow discharge opening to facilitate the air dynamics serving to move the forage or mulch from the chopper 12 to the hopper 22 of the subsoiling chisel assembly 16. Thus, the hood 14 advantageously serves to take a volume of air at its wide feed opening and places it into the narrow discharge opening, this volume of air being used to carry the mulch material through the hood to the hopper. As this volume of air must be released before the mulch enters the trench or channel—otherwise the air would push the mulch out of the ground—the hopper 22 and the flared wings of the subsoiling chisel assembly 16 are provided to deflect or guide the mulch into the desired portion of the channel opening. It is contemplated that a suitable sealing material, such as belting, may be provided at the chopper to prevent objects at the sides of the mulcher from being sucked into the hood as a result of the air movement or vacuum effects existing therein.

In the operation of the invention, the vertical mulcher is secured to a prime mover, such as an agricultural tractor, at the hitch 28, and the vertical mulcher is transported to the desired mulching location in its transport position, as shown in broken line form in Figure 1 of the drawing. It can there be seen that in the transport position, the vertical mulcher is inclined and the subsoiling chisel assembly 16 is raised above ground level. The placement of the vertical mulcher into the transport position may be effected by energization of the hydraulic cylinder 102 which serves, by means of a pivoted front frame cross bar brackets 104, the front frame cross bar 48, and the side members 92 and 94, to elevate the rear portion of the vertical mulcher a desired amount such that the subsoiling chisel assembly 16 is raised above ground level.

When the subsoiling and mulching operation is to be started, the hydraulic cylinder 102 is again operated to lower the rear portion of the vertical mulcher until the subsoiling chisel assembly 16 is positioned a desired depth within the soil. The operating angle of the subsoiling chisel assembly 16 may be adjusted as desired by means of the turnbuckles 48, provided at each end of the tool bar 42.

The height of the chopper unit 12 with respect to the soil may be adjusted, as desired, by means of the hydraulic cylinder 86 pivotally secured to the shaft 82. As the chopper cylinder is connected by means of the chains 110 to the side members 78 and 80 of shaft 82, the chopper 12 may be selectively raised and lowered by suitably energizing the hydraulic cylinder 86.

In accordance with a feature of this invention, the vertical mulcher is self-powered, and thus the energization of the hydraulic cylinders 86 and 102, and the rotation of chopper knives 76 in the chopper cylinder housing 74, are effected by the engine 24 supported on the mount platform 108. As the engine 24 is started and the clutch is engaged to start the chopper 12, the tractor operator can control the chopper height and the depth of the subsoiling chisel assembly by simply utilizing the conveniently located push and pull rods 112 without leaving the tractor seat. Thus, it will be appreciated by those skilled in the art that with the exception of the prime mover, the vertical mulcher is completely self-contained wherein the subsoil chisel and the chopper unit are raised and lowered hydraulically, and the chopper mechanism is powered, by the engine mounted on the mulcher frame assembly. However, it is contemplated that the vertical mulcher may be powered by the tractor power take off and in this event, the engine 24 may be omitted.

We have shown and described a new and highly advantageous vertical mulcher apparatus which combines in a single compact machine all of the elements necessary to perform every function of vertical mulching on a commercial scale in one pass through a field. All that is required in addition to the invention is a tractor to pull it with and an operator.

It will be appreciated by those skilled in the art that many modifications may be made in the construction and arrangement of the parts of the above-described vertical mulcher without departing from the real spirit of the invention, and that it is intended to cover by the appended claims any modified forms of structures, or use of equivalents, which may be reasonably included within their scope.

What is claimed as the invention is:

1. The combination of mulching and subsoiling apparatus comprising a heavy duty, rigid frame structure, a surface crop chopper mounted on said frame structure, an elongated, arcuate hood connected to said chopper for receiving the mulch chopped by the latter and for directing the mulch into a predetermined discharge path rearwardly of said chopper in the direction of draft, said hood being tapered along its elongated, arcuate dimention from a relatively wide feed opening at the chopper to a relatively narrow discharge opening adjacent the rear portion of said frame structure to define said predetermined discharge path and a subsoiling chisel secured to said frame structure rear portion for cutting a trench in the soil to receive the mulch from said hood, said chopper, said hood and said chisel assembly respectively being positioned on said frame structure in the direction of draft.

2. The combination of mulching and subsoiling apparatus in accordance with claim 1 further comprising selectively actuatable means for enabling the operating positions of said chopper and said subsoiling chisel assembly to be adjusted as desired, and a self-contained power unit operatively connected to said selectively actuatable means for applying power thereto.

3. The combination of mulching and subsoiling apparatus in accordance with claim 2 further comprising manually operable control means for said selectively actuable means connected to said power unit for enabling the chopper height and chisel assembly height to be controlled at a point remote therefrom.

4. The combination of mulching and subsoiling apparatus comprising a mobile rigid frame structure having a plurality of wheels and hitch means for enabling the frame structure to be pulled by a prime mover, a power driven surface crop chopper for producing mulch pivotally mounted to said frame structure, first selectively actuatable means connected to said surface crop chopper for enabling the cutting height of said surface crop chopper to be adjusted as desired, an elongated, arcuated hood connected to said surface crop chopper for receiving the mulch chopped by the latter and for directing the mulch into a rearwardly going discharge path in the direction of draft, said hood being tapered along its elongated, arcuate dimension from a relatively wide feed opening at the chopper to a relatively narrow discharge opening at the rear portion of said frame structure to define said rearwardly going discharge path, a subsoiling chisel assembly secured to the rear portion of said frame structure and including a blade portion for cutting a trench in the soil and an outwardly flaring wing portion to hold the trench open and thereby facilitate the flow of mulch into the channel, a hopper secured to said subsoiling chisel assembly and positioned closely adjacent the discharge opening of said hood, said surface crop chopper, said arcuate hood and said subsoiling chisel assembly respectively being aligned on said frame structure in the direction of draft, second selectively actuatable means connected to said frame structure for permitting adjustment of the chisel assembly height, means for adjusting the cutting angle of said chisel assembly relative to the soil, a self-contained power unit operatively connected to said first and second selectively actuatable means for supplying power thereto, and manually operable control means for said selectively actuatable means connected to said power unit for enabling the chopper height and chisel assembly height to be controlled at a point remote therefrom.

5. The combination of mulching and subsoiling apparatus comprising a mobile rigid frame structure, a surface crop chopper for producing mulch pivotally mounted to said frame structure, first selectively actuatable means connected to said chopper for enabling the cutting height of said chopper unit to be adjusted as desired, an elongated, arcuate hood connected to said chopper for receiving the mulch chopped by the latter and directing the mulch into a predetermined discharge path rearwardly of said chopper in the direction of draft, a subsoiling chisel assembly secured to said frame structure and including a blade portion for cutting a trench in the soil, a hopper secured to said subsoiling chisel assembly and positioned adjacent the discharge end of said hood, said surface crop chopper, said arcuate hood and said subsoiling chisel assembly respectively being aligned on said frame structure in the direction of draft, second selectively actuatable means connected to said frame structure for permitting adjustment of the chisel assembly height, means for adjusting the cutting angle of said chisel assembly relative to the soil, a self-contained power unit operatively connected to said first and second selectively actuatable means for supplying power thereto, and manually operable control means for said selectively actuatable means connected to said power unit for enabling the chopper height and chisel assembly height to be controlled at a point remote therefrom.

6. The combination of mulching and subsoiling apparatus comprising a unitary, rigid frame structure, a surface crop chopper for producing mulch pivotally mounted to said frame structure, an elongated, arcuate hood connected to said surface crop chopper for receiving the mulch chopped by the latter and directing the mulch into a predetermined discharge path in the direction of draft, said hood being tapered along its elongated, arcuate dimension from a relatively wide feed opening at the surface crop chopper to a relatively narrow discharge opening at the rear portion of said frame structure to define said predetermined discharge path, a subsoiling chisel assembly secured to the rear portion of said frame structure and including a blade portion for cutting a trench in the soil, and a hopper secured to said subsoiling chisel assembly and positioned adjacent the discharge opening of said hood, said surface crop chopper, said arcuate hood and said chisel assembly respectively being positioned in longitudinal alignment on said frame structure in the direction of draft.

References Cited in the file of this patent
UNITED STATES PATENTS

| | | |
|---|---|---|
| 1,208,856 | Storey | Dec. 19, 1916 |
| 2,657,620 | Meeks | Nov. 3, 1953 |
| 2,741,173 | White | Apr. 10, 1956 |
| 2,786,317 | Lundell | Mar. 26, 1957 |

OTHER REFERENCES

Publication: Spain et al., Agronomy Journal, vol. 48, pages 192–193, 1956, and attached paper on "Vertical Mulching," received in Patent Office March 15, 1957.